(12) United States Patent
Yamamoto et al.

(10) Patent No.: US 9,410,792 B2
(45) Date of Patent: Aug. 9, 2016

(54) RESOLVER DEVICE, MOTOR CONTROL DEVICE, AND MOTOR CONTROL METHOD

(75) Inventors: Takayuki Yamamoto, Chiyoda-ku (JP); Shunichi Wada, Chiyoda-ku (JP); Katsuya Ikemoto, Chiyoda-ku (JP); Chiaki Fujimoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 90 days.

(21) Appl. No.: 14/376,935

(22) PCT Filed: Apr. 12, 2012

(86) PCT No.: PCT/JP2012/060025
§ 371 (c)(1),
(2), (4) Date: Aug. 6, 2014

(87) PCT Pub. No.: WO2013/153653
PCT Pub. Date: Oct. 17, 2013

(65) Prior Publication Data
US 2014/0375241 A1    Dec. 25, 2014

(51) Int. Cl.
*H02P 7/00* (2016.01)
*G01B 7/30* (2006.01)
(Continued)

(52) U.S. Cl.
CPC .. *G01B 7/30* (2013.01); *G01D 3/08* (2013.01); *G01D 5/2046* (2013.01)

(58) Field of Classification Search
CPC ............ H02P 29/022; H02K 11/0021; H02K 11/001; G01B 7/30
USPC ......... 318/490, 603, 605, 652, 661, 671, 560, 318/400.37, 400.39, 721, 437
See application file for complete search history.

(56) References Cited

U.S. PATENT DOCUMENTS

| | | | | |
|---|---|---|---|---|
| 5,469,032 A | * | 11/1995 | Otake | ................... B60L 3/0023 318/400.21 |
| 6,191,550 B1 | * | 2/2001 | Yoshihara | ............. B60L 3/0023 318/638 |

(Continued)

FOREIGN PATENT DOCUMENTS

| JP | 9-72758 A | 3/1997 |
|---|---|---|
| JP | 2006-177750 A | 7/2006 |

(Continued)

OTHER PUBLICATIONS

International Search Report for PCT/JP2012/060025 dated Jul. 17, 2012.

(Continued)

*Primary Examiner* — Bentsu Ro
*Assistant Examiner* — Thai Dinh
(74) *Attorney, Agent, or Firm* — Sughrue Mion, PLLC (57) ABSTRACT

A resolver device (14) includes: a microcomputer (1) for outputting a control signal for driving a motor (4) to a drive circuit (3); a sensor section (5) (resolver) for outputting detection values (a sine signal and a cosine signal) in accordance with a rotation angle of the motor (4); and a signal circuit (13) provided between the microcomputer (1) and the sensor section (5). The microcomputer (1) determines an abnormality when the detection values of the sensor section (5) are out of a first normal range and then determines return of the sensor section (5) to normal when the detection value is present within a second normal range and in a plurality of regions obtained by dividing the first normal range.

10 Claims, 6 Drawing Sheets

(51) Int. Cl.
*G01D 5/20* (2006.01)
*G01D 3/08* (2006.01)

(56) References Cited

U.S. PATENT DOCUMENTS

| | | | | |
|---|---|---|---|---|
| 7,154,404 | B2* | 12/2006 | Sato | B62D 5/0493 180/402 |
| 7,355,826 | B2* | 4/2008 | Ochiai | B60L 3/0023 361/23 |
| 7,388,527 | B2* | 6/2008 | Kushihara | H03M 1/1076 341/114 |
| 7,835,833 | B2* | 11/2010 | Mizutani | F16H 59/105 701/31.7 |
| 8,179,079 | B2* | 5/2012 | Mukai | B62D 5/046 318/254.1 |
| 8,989,966 | B2* | 3/2015 | Itamoto | B62D 5/0484 701/43 |
| 2008/0052562 | A1* | 2/2008 | Kameya | G01D 5/24466 714/47.1 |
| 2009/0206828 | A1* | 8/2009 | Yamaura | G01D 3/08 324/207.25 |

FOREIGN PATENT DOCUMENTS

| | | |
|---|---|---|
| JP | 2008-51559 A | 3/2008 |
| JP | 2009-80002 A | 4/2009 |

OTHER PUBLICATIONS

Communication dated Sep. 8, 2015 from the European Patent Office in counterpart application No. 12874177.4.

* cited by examiner

RESOLVER DEVICE, MOTOR CONTROL DEVICE, AND MOTOR CONTROL METHOD

CROSS REFERENCE TO RELATED APPLICATIONS

This application is a National Stage of International Application No. PCT/JP2012/060025 filed Apr. 12, 2012, the contents of which are incorporated herein by reference in their entirety.

TECHNICAL FIELD

The present invention relates to a resolver device, a motor control device, and a motor control method, in particular, a resolver device for detecting an abnormality in a resolver which outputs a sine signal indicating sin θ and a cosine signal indicating cos θ in accordance with a rotation angle θ of a rotating body, a motor control device using the same, and a motor control method therefor.

BACKGROUND ART

As a related-art abnormality detection device for a resolver, a device described in Patent Literature 1 has been proposed, for example. In the abnormality detection device described in Patent Literature 1, $sin^2 θ + cos^2 θ$ is calculated based on a sine signal and a cosine signal. When the calculated value is out of a predetermined normal range, the occurrence of an abnormality in the resolver is determined.

CITATION LIST

Patent Literature

[PTL 1] JP 09-72758 A

SUMMARY OF INVENTION

Technical Problem

Once determining that the resolver is abnormal, the abnormality detection device described in Patent Literature 1 executes a predetermined procedure in case of abnormality, such as temporarily stopping drive of a motor, based on the determination of an abnormality. Therefore, even when the resolver returns to be in the normal state while a target to be controlled is being controlled by using the resolver, because the abnormality detection device does not have a function of detecting the return, the return is not determined unless the drive of the motor is temporarily stopped to perform a procedure of restart or the like.

The present invention has been made to solve the problem described above, and has an object to provide a resolver device, a motor control device, and a motor control method, which are capable of determining whether or not a resolver is normal again after detection of an abnormality in the resolver.

Solution to Problem

According to one embodiment of the present invention, there is provided a resolver device, including: a resolver for detecting at least one of a sine signal and a cosine signal in accordance with a rotation angle of a rotating body as a detection value; an abnormality detection section for determining whether or not the detection value falls within a predetermined first normal range to determine whether or not there is an abnormality in the resolver; a region division section for dividing the predetermined first normal range into a plurality of regions; a region determination section for determining whether or not the detection value falls within a predetermined second normal range and within which of the plurality of regions of the predetermined first normal range the detection value falls, the plurality of regions being obtained by the division by the region division section, and for determining that the resolver is normal when detecting presence of the detection value in a predetermined number of the regions; and a return determination section for determining return of the resolver to normal when the region determination section determines that the resolver is normal after the abnormality detection section determines that the resolver is abnormal.

Advantageous Effects of Invention

According to the one embodiment of the present invention, there is provided the resolver device, including: the resolver for detecting at least one of the sine signal and the cosine signal in accordance with the rotation angle of the rotating body as the detection value; the abnormality detection section for determining whether or not the detection value falls within the predetermined first normal range to determine whether or not there is an abnormality in the resolver; the region division section for dividing the predetermined first normal range into the plurality of regions; the region determination section for; determining whether or not the detection value falls within a predetermined second normal range and within which of the plurality of regions of the predetermined first normal range the detection value falls, the plurality of regions being obtained by the division by the region division section, and for determining that the resolver is normal when detecting presence of the detection value in a predetermined number of the regions; and the return determination section for determining return of the resolver to normal when the region determination section determines that the resolver is normal after the abnormality detection section determines that the resolver is abnormal. The resolver device can determine whether or not the resolver is normal again after detection of the abnormality in the resolver, and can thus automatically continue the control over the drive of the rotating body.

DESCRIPTION OF EMBODIMENTS

First Embodiment

A first embodiment of the present invention is described below referring to the drawings.

Figure 1:
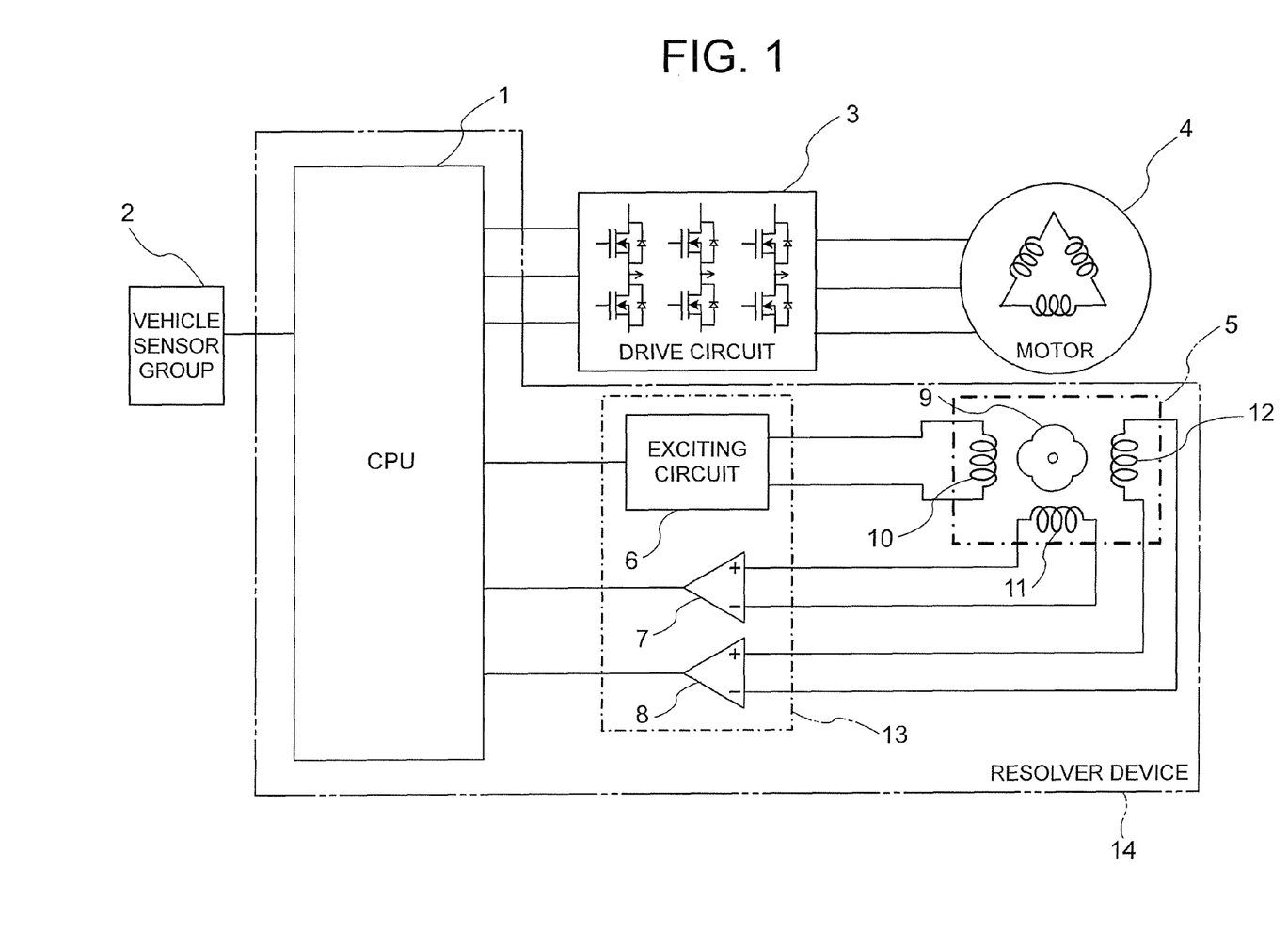
FIG. 1 is an overall view of a device according to a first embodiment of the present invention.

FIG. 1 is a diagram illustrating a configuration of a motor control device according to the first embodiment of the present invention. In FIG. 1, a motor 4 is illustrated as an example of a rotating body. The motor control device includes a resolver device 14 and controls drive of the motor 4 (rotating body) which is a target to be controlled. The motor control device uses the resolver device 14 as means for detecting rotation of an output shaft of the motor 4. The motor 4 is, for example, a three-phase brushless motor. The motor 4 and the motor control device are mounted in a vehicle such as an automobile.

As illustrated in FIG. 1, in the first embodiment, the motor control device includes a drive circuit 3, a vehicle sensor group 2, a microcomputer 1, and a resolver device 14. The drive circuit 3 outputs control signals to the motor 4. The motor 3 has three phases. Therefore, the drive circuit 3 includes three switching elements for each of an upper arm and a lower arm, that is, six switching elements in total. The switching elements for the upper arm and the switching elements for the lower arm are respectively connected in series in a one-by-one manner to form three series-connected members in total. The microcomputer 1 computes a control amount to be output to the drive circuit 3. The vehicle sensor group 2 includes a plurality of sensors and detects a vehicle state to input vehicle-state information to the microcomputer 1 as input information.

The resolver device 14 is provided in the motor control device. The resolver device 14 includes a sensor section 5 (resolver), a signal circuit 13, and the microcomputer 1. In the resolver device 14, the sensor section 5 (resolver) detects a rotation angle of the motor 4 and a rotation speed of the motor 4 to detect control timing for the drive circuit 3, and transmits these information to the microcomputer 1. The sensor section 5 (resolver) is provided in the vicinity of the motor 4. The sensor section 5 (resolver) includes, in the inside thereof, a rotor 9 which rotates in synchronization with the output shaft of the motor 4, an exciting coil 10, a sine-wave coil 11 for outputting a sine signal ($\sin \theta$) in accordance with a rotation angle $\theta$ of the rotor 9, and a cosine-wave coil 12 for outputting a cosine signal ($\cos \theta$) in accordance with the rotation angle $\theta$ of the rotor 9. The rotor 9 has four protrusions. By an exciting signal applied to the exciting coil 10, signals are generated in the sine-wave coil 11 and the cosine-wave coil 12 which are transformer-coupled through an intermediation of the protrusions of the rotor 9.

The signal circuit 13 includes an exciting circuit 6 for driving the exciting coil 10, an interface circuit 7 for shaping the sine signal output from the sine-wave coil 11, and an interface circuit 8 for shaping the cosine signal output from the cosine-wave coil 12. The exciting circuit 6 outputs an exciting signal based on a signal from the microcomputer 1. The sine signal detected by the sine-wave coil 11 and the cosine signal detected by the cosine-wave coil 12 are input to the microcomputer 1 respectively through the interface circuits 7 and 8.

Figure 2A:
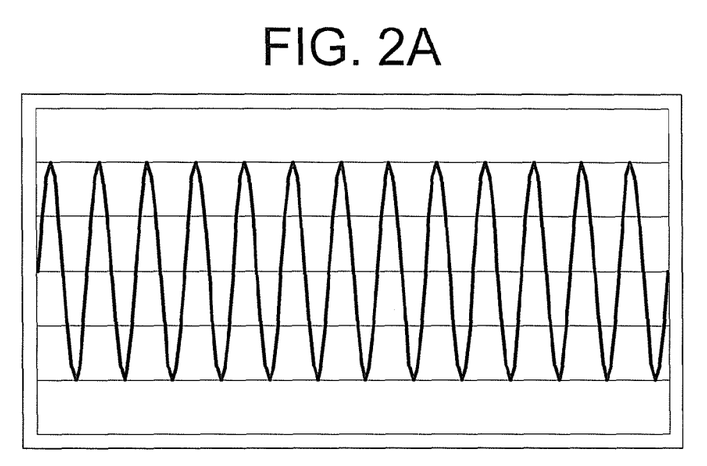
FIGS. 2A, 2B and 2C are signal waveform diagrams of a resolver according to the first embodiment of the present invention.
Figure 2B:
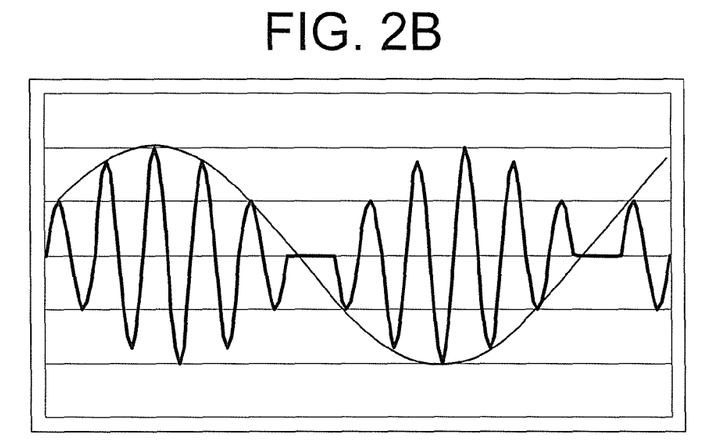
Figure 2C:
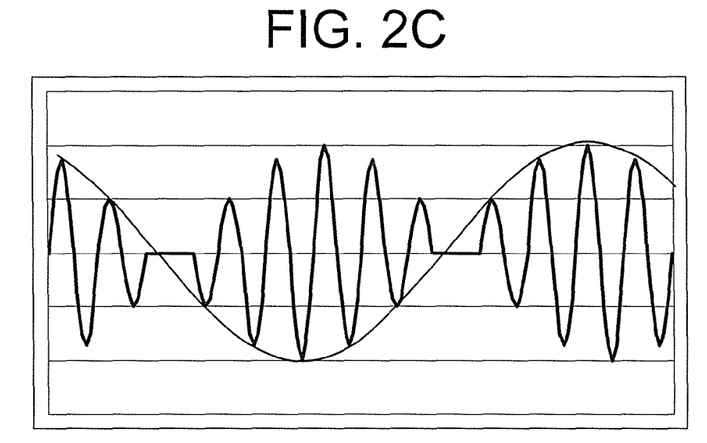

FIGS. 2A, 2B and 2C show the signals of the resolver device 14. FIG. 2A shows an excitation waveform of the exciting signal output from the exciting circuit 6, which drives the exciting coil 10 at predetermined frequency and amplitude. FIG. 2B shows a sine wave of the sine signal output from the sine-wave coil 11. FIG. 2C shows a cosine wave of the cosine signal output from the cosine-wave coil 12. The rotor 9 rotates in synchronization with the output shaft of the motor 4. By the rotation of the rotor 9, the sine wave shown in FIG. 2B and the cosine wave shown in FIG. 2C are generated. Peak values of the sine wave and the cosine wave are read by the microcomputer 1. The microcomputer 1 computes a tangent angle (tan) based on the peak values to calculate a rotation angle $\theta$ of the motor 4. The sine wave and the cosine wave have a phase shift of 90 degrees therebetween. Therefore, theoretically, the following Expression (1) can be obtained.

$$\sin^2\theta + \cos^2\theta = K \qquad (1)$$

In the expression, K is a constant.

By using the description given above, when a value obtained by adding a square value of the sine signal and a square value of the cosine signal falls within a range of $K \pm \alpha$ as expressed by the following Expressions (2), it is determined that the sensor section 5 (resolver) is normal. On the other hand, when the value obtained by adding the square value of the sine signal and the square value of the cosine signal is out of the range of $K \pm \alpha$ as expressed by the following Expressions (2), it is determined that the sensor section 5 (resolver) is abnormal. A value of $\alpha$ is determined as required.

Normal range: $K - \alpha < \sin^2\theta + \cos^2\theta < K + \alpha$

Abnormal range: $\sin^2\theta + \cos^2\theta < K - \alpha$ or $$\sin^2\theta + \cos^2\theta K + \alpha \qquad (2)$$

Figure 3:
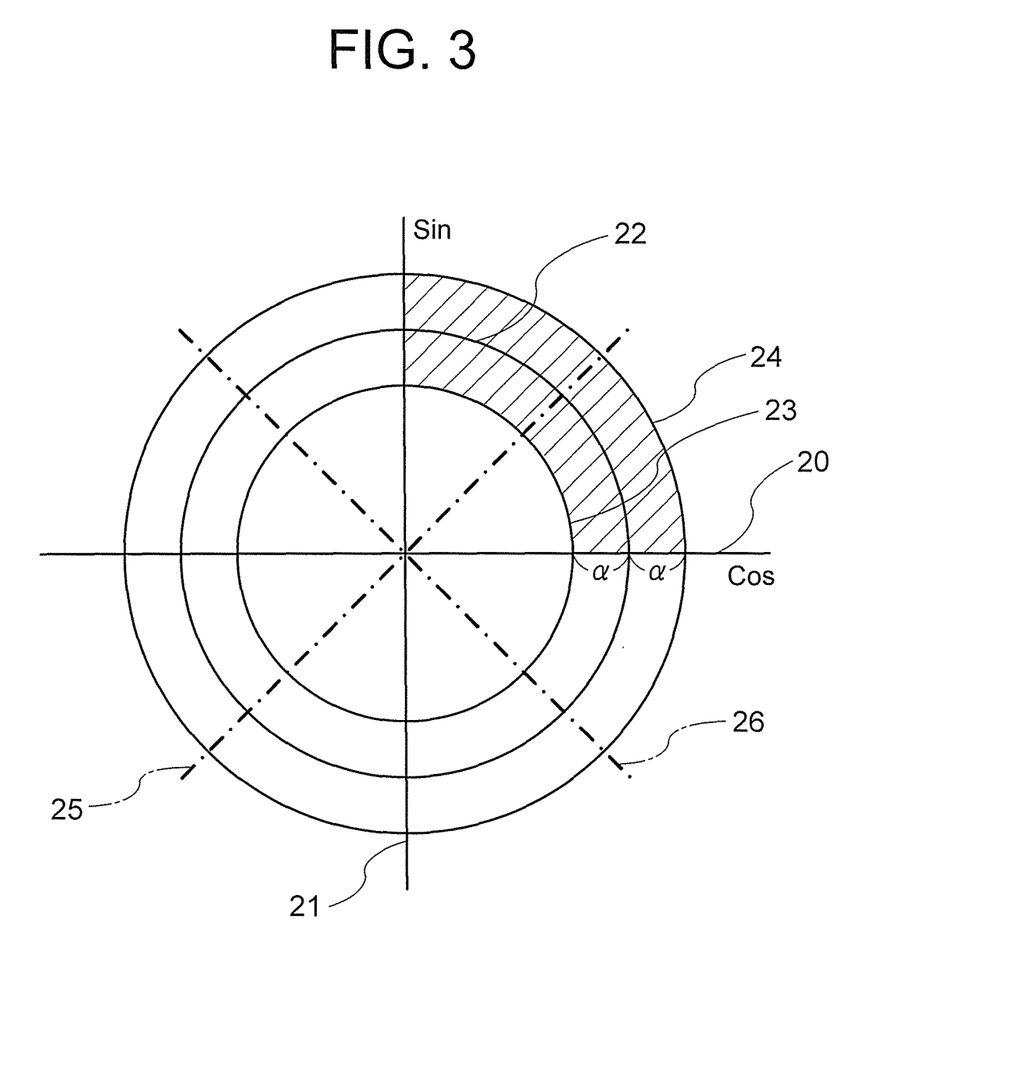
FIG. 3 is a diagram illustrating a normal range and divided regions for the resolver according to the first embodiment of the present invention.

Next, an algorithm of returning to normal in the resolver device 14 in the case where it is determined that the sensor section 5 (resolver) is abnormal is described referring to FIG. 3. In FIG. 3, an X axis (20) indicates the cosine signal, whereas a Y axis (21) indicates the sine signal. FIG. 3 is a Lissajous figure of detection signals of the sine-wave coil 11 and the cosine-wave coil 12 of the sensor section 5 (resolver) on an X-Y plane. In FIG. 3, three concentric circles 22 to 24 having an intersection (point of origin) of the X axis (20) and the Y axis (21) as a center are drawn. In an ideal case, the detection signals of the sine-wave coil 11 and the cosine-wave coil 12 are located on the circle (22), indicating a line of K expressed by Expression (1) described above. The smaller circle (23) on the inner side of the circle (22) and the larger circle (24) on the outer side of the circle (22) indicate a range in which the sensor section 5 (resolver) can be regarded as normal (hereinafter referred to as "normal range"). A difference between each of the circles (23, 24) and the ideal circle (22) is $\alpha$. When the detection signals of the sensor section 5 (resolver) are normal, the detection signals fall within the normal range having a doughnut-like shape between the smaller circle (23) and the larger circle (24).

Further, the doughnut-like normal range can be divided into a plurality of regions. For example, when divided by the X axis (20) and the Y axis (21), the normal range is divided into four regions. When divided by split lines 25 and 26 (45-degree lines) in addition to the X axis (20) and the Y axis (21), the normal range is divided into eight regions. The microcomputer 1 includes counters CNTi (i=1, 2, 3, ..., n, where n is the number of regions) provided to the respective regions. Each of the counters CNTi (i=1, 2, 3, ..., n) counts the number of times that the detection values ($\sin \theta$ and $\cos \theta$) of the sine-wave coil 11 and the cosine-wave coil fall within the corresponding region. Specifically, when detecting that the detection values fall within the corresponding region, each of the counters CNTi (i=1, 2, 3, ..., n) adds 1 to a counter value and stores the counter value. In this manner, when the counter value of the counter CNTi of each of the regions reaches a predetermined value after sequentially incrementing the counter value based on the values of the detection signals of the sine-wave coil 11 and the cosine-wave coil 12, for example, when all the counter values become equal to or larger than 2, the microcomputer 1 determines that the sensor section 5 (resolver) has returned to normal. In this manner, in this embodiment, instead of determining the return to normal based merely on the detection signals of the sine-wave coil 11 and the cosine-wave coil 12 falling within the normal range, the microcomputer 1 also checks trajectories of the detection signals (namely, the number of times that the signals fall within each of the regions) to determine the return to normal.

The example of FIG. 3 illustrates the case where the doughnut-like normal range is divided by the predetermined values (namely, the X axis 20, the Y axis 21, and the split lines 25 and 26) which are set for each of the sine signal and the cosine signal. However, the division of the doughnut-like normal range is not limited thereto. The doughnut-like normal range may be divided only by a predetermined value which is set for any one of the sine signal and the cosine signal.

Figure 4:
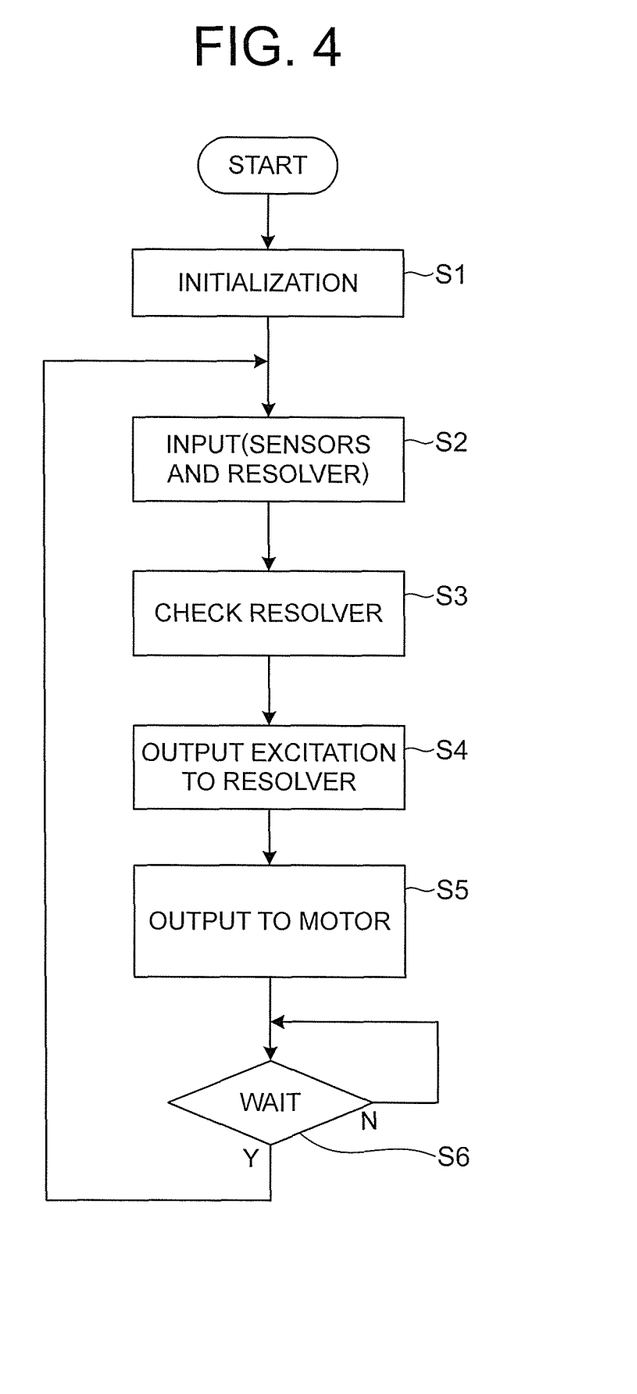
FIG. 4 is a schematic flowchart according to the first embodiment of the present invention.
Figure 5:
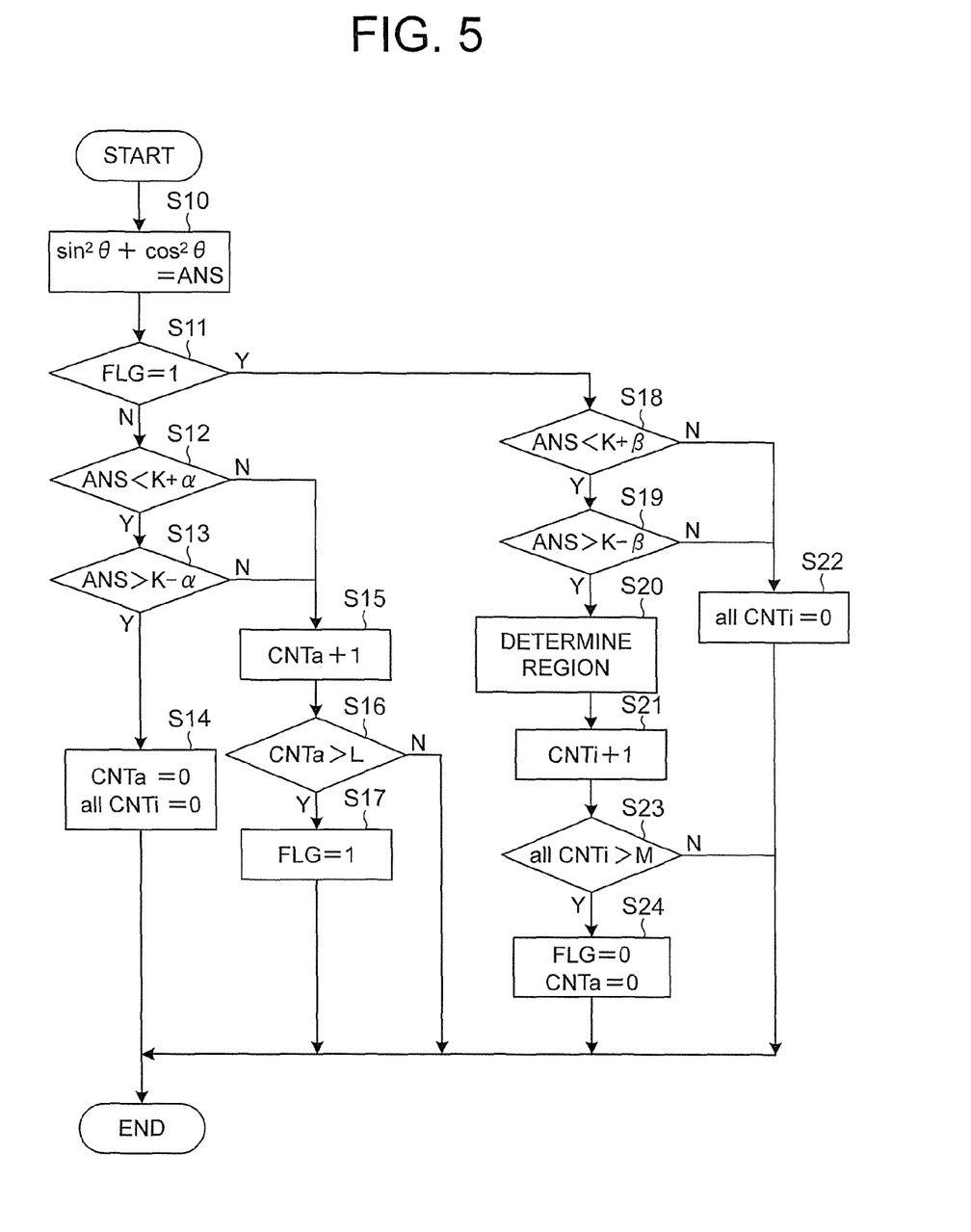
FIG. 5 is a detailed flowchart according to the first embodiment of the present invention.

Next, a method of returning to normal is specifically described referring to FIGS. 4 and 5. The method is entirely carried out by the microcomputer 1. Therefore, FIGS. 4 and 5 are flowcharts illustrating a flow of the microcomputer 1. First, FIG. 4 illustrates a schematic flow. In FIG. 4, when the microcomputer 1 is powered ON, a port, a RAM, and the like of the microcomputer 1 are first initialized in Step S1. Next, in Step S2, various types of information are input. The information includes the information from the vehicle sensor group 2 and the information from the sensor section 5 (resolver). The signal from the sensor section 5 (resolver) contains the values of the sine signal from the sine-wave coil 11 and the cosine signal from the cosine-wave coil 12. Next, in Step S3, whether or not the sensor section 5 (resolver) is abnormal is determined, and the return to normal is checked. A method thereof is described later.

In Step S4, an exciting signal at, for example, 10 KHz is output to the exciting coil 10 of the sensor section 5 (resolver). In Step S5, the control amount is computed based on the information from the vehicle sensor group 2, which is obtained in Step S2, so that a control signal for rotating the motor 4 is output to the drive circuit 3. In Step S6, the microcomputer 1 waits until a predetermined time period elapses. After elapse of the predetermined time period, the microcomputer 1 returns to Step S2 again. In this manner, the processing from Steps S2 to S6 is periodically repeated.

Next, referring to FIG. 5, the processing in Step S3 illustrated in FIG. 4 (determination of an abnormality in the sensor section 5 (resolver) and the determination of return to normal) is described.

First, in Step S10, a value which is obtained by adding a value obtained by squaring the value of the sine signal and a value obtained by squaring the cosine signal is calculated as ANS ($\sin^2\theta+\cos^2\theta$=ANS). Next, in Step S11, whether or not an abnormality flag FLG is set is checked. The abnormality flag FLG is set when an abnormality occurs in the sensor section 5 (resolver). When the abnormality flag is not set (No), specifically, when the sensor 5 (resolver) is not abnormal, it is determined in Step S12 whether or not the value of ANS obtained in Step S10 is smaller than a predetermined value (K+$\alpha$) which indicates an upper limit of the normal range. When ANS is smaller (Yes) as a result of the determination, it is determined in Step S13 whether or not the value of ANS is larger than a predetermined value (K-$\alpha$) which indicates a lower limit of the normal range. When ANS is larger (Yes) as a result of the determination, the detection values of the sensor section 5 (resolver) fall within the normal range (K-$\alpha$<ANS<K+$\alpha$). Therefore, a counter CNTa (abnormal counter) and all the counters CNTi (normal counters) are reset in Step S14. Then, the processing is terminated. The counters CNTi (i=1, 2, 3, . . . , n) are respectively provided to the respective regions illustrated in FIG. 3 in a one-by-one manner, as described above.

When it is determined as negative (No) in Step S12 or S13, the detection values (sin $\theta$, cos $\theta$) of the sensor section 5 (resolver) are out of the normal range. Thus, 1 is added to a counter value of the counter CNTa (abnormal counter) in Step S15. Next, in Step S16, it is determined whether or not the counter value exceeds a predetermined value L. When the counter value exceeds the predetermined value L (Yes), it is determined that the sensor section 5 (resolver) is abnormal, and the abnormality flag FLG is set (specifically, the value of the abnormality flag FLG is set to 1) in Step S17. On the other hand, when the counter value does not exceed the predetermined value L (No), each of the processing is terminated without any further processing. In this manner, in this embodiment, when the number of times that the detection value (sin $\theta$, cos $\theta$) of the sensor section 5 (resolver) is consecutively determined as being out of the normal range exceeds L, it is determined that an abnormality occurs in the sensor 5 (resolver). A value of L is preset to any value equal to or larger than 1 as required.

The processing described above is processing for determining whether or not there is an abnormality in the sensor section 5 (resolver). Therefore, the processing from Steps S10 to S17 configures an abnormality detection section for determining whether or not there is an abnormality in the sensor section 5 (resolver) by determining whether or not the detection values of the sensor section 5 (resolver) fall within the predetermined normal range.

Next, the description continues for a method for determining whether or not the sensor section 5 (resolver) returns to normal again after it is determined that the sensor section 5 (resolver) is abnormal.

When it is determined that the abnormality flag FLG is set (Yes) in Step S11, it is then determined in Step S18 whether or not the value of ANS obtained in Step S10 is smaller than a predetermined value (K+$\beta$) which indicates an upper limit of a normal range. Here, $\beta$ is a preset value. The value of $\beta$ may be the same as the value of $\alpha$ which is used in Steps S12 and S13 or may be different therefrom. When ANS is smaller than the predetermined value (K+$\beta$) (Yes) as a result of the determination, it is then determined in Step S19 whether or not the value of ANS is larger than a predetermined value (K-$\beta$) which indicates a lower limit of the normal range. When ANS is larger than the predetermined value (K-$\beta$) (Yes) as a result of the determination, the detection values of the sensor section 5 (resolver) fall within the normal range (K-$\beta$<ANS<K+$\beta$). On the other hand, when the value of ANS is out of the normal range (No) in Step S18 or S19, all the counters CNTn (normal counters) are reset in Step S22. This means that the determination for the return to normal again is restarted from the beginning if the values of the sine signal and the cosine signal are out of the normal range even once.

When the value of ANS falls within the normal range (K-$\beta$<ANS<K+$\beta$) as a result of the determinations in Steps S18 and S19, it is determined, in Step 20, in which of the plurality of regions obtained by the division the value of ANS is present. The determination corresponds to determination in which of the plurality of regions illustrated in FIG. 3 the value of ANS is present, in accordance with magnitudes of the sine signal and the cosine signal. In the respective regions illustrated in FIG. 3, the counters CNTi (i=1, 2, 3, . . . , n) are provided. Therefore, in Step S21, 1 is added to the counter value of the counter CNTi (i=1, 2, 3, . . . ) which corresponds to the region in which ANS is currently present. The processing in Steps S18 to S22 configures: a region division section for dividing a first normal range (K−α<ANS<K+α) into the plurality of regions; and a region determination section for determining whether or not the detection values of the sensor section 5 (resolver) fall within a second normal range (K−β<ANS<K+β) and determining in which of the plurality of regions of the first normal range (K−α<ANS<K+α) divided by the region division section the detection values are present respectively, and determining that the sensor section 5 (resolver) is normal when it is detected that the detection values present in a predetermined number of regions.

Next, in Step S23, whether or not the counter values of the respective counters CNTi (i=1, 2, 3, . . . ) exceed a predetermined value M is checked. Specifically, whether or not ANS has been present in all the regions for a predetermined number of times (M+1 times) for each. For example, when the normal range is divided into four regions, i=1 to 4 and n=4 are obtained. Therefore, four counters CNTi are required. Thus, the above-mentioned check means the counter values of all the four counters CNT1, CNT2, CNT3, and CNT4 are checked. Specifically, only after verifying that ANS falls within the normal range and the detection values (sin θ, cos θ) have been present in all the four regions for M+1 times for each, the return to normal is determined. Although the example where all the regions of the normal range are used as targets has been described, all the regions are not necessarily required to be targets. Specifically, the determination for the return to normal may be made by using a predetermined number of regions among the plurality of regions (for example, two regions among four regions).

When it is determined that all the counters CNTi exceed the predetermined value M (Yes) in Step S23, the abnormality flag FLG is reset (specifically, 0 is set to the abnormality flag FLG) for the first time, and it is determined that the sensor section 5 (resolver) has returned to normal in Step S24. Moreover, the counter CNTa for abnormality detection is also reset. On the other hand, when the counter value of at least one of all the counters CNTi does not exceed the predetermined value M (No) in Step S23, the return to normal cannot be determined. Therefore, the processing is terminated without further processing. Steps S23 and 24 configure a return determination section.

As described above, for the return to normal, only after the detection values of the sensor section 5 (resolver) are continuously present in the normal range, and further are present in all the regions illustrated in FIG. 3 (or a plurality of predetermined regions in FIG. 3) for the plurality of times (M+1 times) or more, the return to normal is determined. As described above, in this embodiment, the return of the sensor section 5 (resolver) to normal can be determined. Therefore, even when the sensor section 5 (resolver) returns to normal after becoming abnormal while the motor 4 is driving, the control over the motor 4 can be automatically continued without an operation such as restart.

Moreover, the normal range (K−α<ANS<K+α) for the abnormality determination in Steps S12 and S13 and the normal range (K−β<ANS<K+β) for the determination of the return to normal in Steps S18 and S19 may be different from each other. In this case, the normal range for the abnormality determination may be set larger than the normal range for the determination of the return to normal so as to have a hysteresis. Specifically, α and β in FIG. 5 are set so as to satisfy α>β. In this manner, the condition for the determination of the return to normal, which is stricter than the condition for the determination of an abnormality, is set. As a result, the return to normal can be prevented from being erroneously determined.

The predetermined value L and the predetermined value M for each of the counter values may be the same or may be different. When M>L is set, the return to normal can be strictly limited in an easy way, which provides the effect of preventing erroneous determination of the return to normal.

The return to normal is not determined merely because the detection values of the sensor section 5 (resolver) fall within the normal range. The determination of the region is used instead. Specifically, after the detection values of the sensor section 5 (resolver) which is determined as being abnormal are successfully detected in each of the plurality of regions of the normal range for a plurality of times, the return to normal is determined. Therefore, the determination for the return to normal is made with increased achievement of the return to normal. Further, by carrying out the determination for the return to normal, the control over the drive of the motor 4 can be automatically continued.

Second Embodiment

Figure 6:
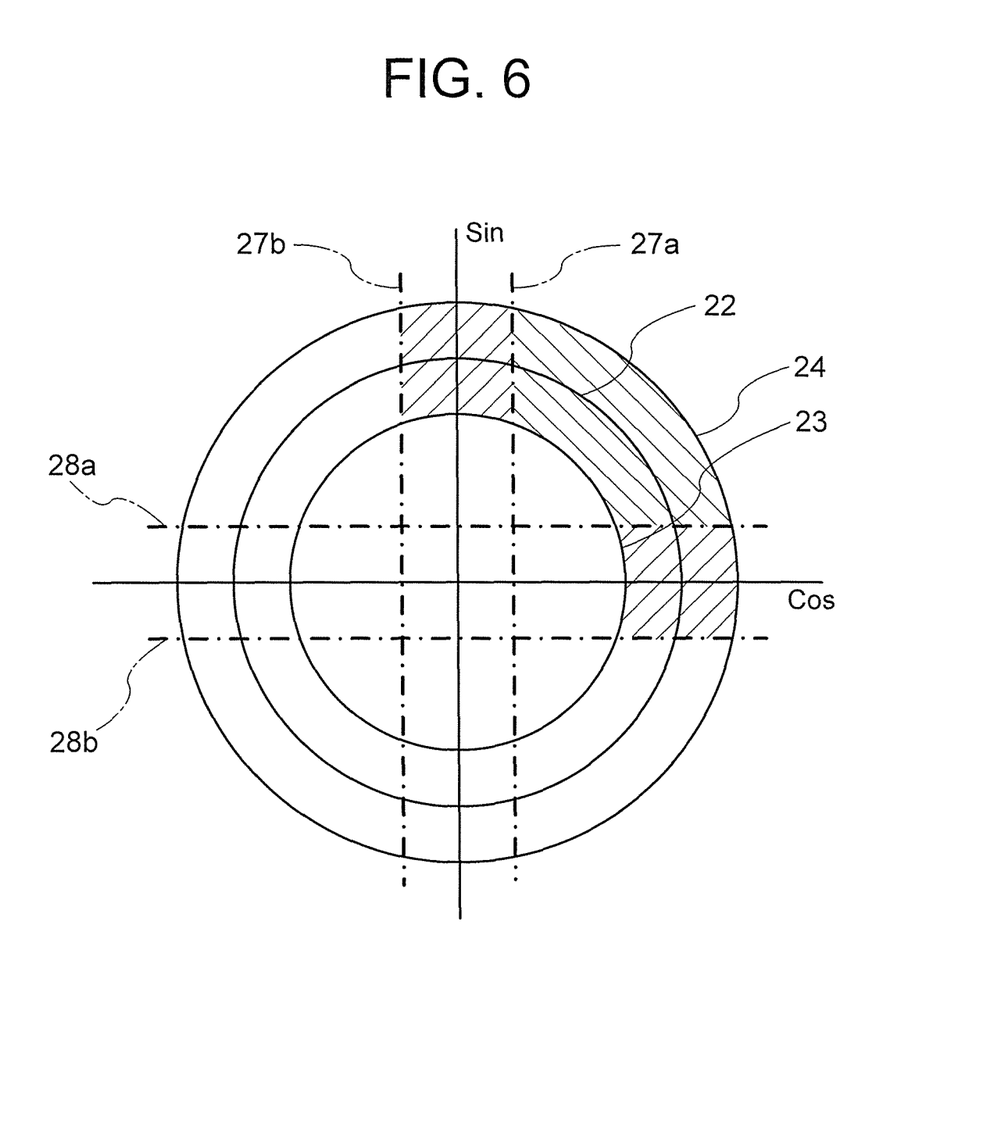
FIG. 6 is a diagram illustrating a normal range and divided regions for a resolver according to a second embodiment of the present invention.

In this embodiment, another dividing method for dividing the normal range into regions is described referring to FIG. 6. In FIG. 3 according to the first embodiment, the range is divided by using the X axis, the Y axis, and/or the diagonal lines (25 and 26). In the division into the regions by the diagonal lines, however, a combination of the sine signal and the cosine signal is used. Hence, the determination of the region becomes a little complicated. Therefore, in this embodiment, the division is performed by using absolute values of the sine signal and the cosine signal, as illustrated in FIG. 6. Specifically, as an absolute value A1 of the sine signal, two split lines (27a and 27b) which are parallel to the Y axis to be located with the Y axis therebetween, are drawn. Similarly, two split lines (28a and 28b) which are parallel to the X axis to be located with the X axis therebetween are drawn as an absolute value A1 of the cosine signal. Therefore, the division into eight by the above-mentioned four split lines (27a, 27b, 28a, and 28b) is performed. Specifically, the doughnut-like normal range defined by the circles 23 and 24 is divided by the four straight lines (27a, 27b, 28a, and 28b) into eight regions. As a result, the determination of the region becomes simpler than in the first embodiment. The value of A1 may be different between the sine signal and the cosine signal.

In this embodiment, by checking whether or not the sum of the square of the detection value of the sine signal and the square of the detection value of the cosine signal ($\sin^2\theta + \cos^2\theta$) falls within the range from K−α to K+α and then checking whether or not the absolute value of the sine signal or the cosine signal is equal to or smaller than A1, the region can be specified.

When the determination of the region described above is used, the need of the computation for the sum of squares can be eliminated. Specifically, the presence/absence in the normal range can be determined and the determination of the region can be made by determining a magnitude relationship between each of the absolute value of the sine signal and the absolute value of the cosine signal and K±α.

As described above, in the second embodiment, the same effects as those obtained by the first embodiment can be obtained. In addition, in the second embodiment, the split lines (27a, 27b, 28a, and 28b) which are respectively parallel to the X axis and the Y axis are used as the split lines used for the determination of the region. As a result, the determination of the region within which the detection values of the sensor section 5 (resolver) fall can be more simplified.

The example illustrated FIG. 6 describes the case where the doughnut-like normal range is divided by the predetermined values (split lines 27a, 27b, 28a, and 28b) which are set respectively for the sine signal and the cosine signal. However, the division of the normal range is not limited to the above-mentioned case. The doughnut-like normal range may also be divided by values set for any one of the sine signal and the cosine signal.

Third Embodiment

Next, a third embodiment of the present invention is described. By obtaining a tangent value (tan θ) from the detection values (sin θ, cos θ) of the sensor section 5 (resolver), the rotation angle of the motor 4 is obtained. Further, by computing a change in the rotation angle for each predetermined time period, a rotation angular velocity of the motor 4 can be easily obtained. It is known that the rotation angular velocity of the motor 4 is driven by the microcomputer 1 within a predetermined range in consideration of a magnitude of a load on the motor 4. Therefore, in this embodiment, the microcomputer 1 further includes a rotation angular velocity detection section (not shown) for detecting the rotation angular velocity of the motor 4 so that the determination for the return to normal is not made when the detected rotation angular velocity is out of a predetermined range, in particular, the rotation angular velocity is higher than the predetermined range. Specifically, when the microcomputer 1 determines that the motor 4 is rotating at a high speed (determines that an angular velocity of the motor 4 is larger than a predetermined value), the microcomputer 1 resets all the counters CNTi illustrated in FIG. 5 (Step S22).

Alternatively, the microcomputer 1 prohibits the addition of 1 to the counter value of the counter CNTi (Step S21). In this manner, when the angular velocity of the motor 1 is higher than the preset angular velocity, the return determination section is prohibited from determining the return to normal or the region determination section is prohibited from determining the region. In this manner, the detection values of the sensor section 5 (resolver) are prohibited from being determined as normal.

Alternatively, in the flowchart of FIG. 5, a step of determining whether or not an angular velocity of the motor 4 is equal to or lower than a predetermined value may be provided between Steps S21 and S23 and the flow of FIG. 5 may be changed so that the processing proceeds to Step S23 only when the angular velocity is equal to or lower than the predetermined value.

As described above, in the third embodiment, the same effects as those obtained by the first embodiment are obtained. In addition, in the third embodiment, when the rotation of the motor 4 at the angular velocity within or higher than the preset range is detected, the return to normal is not determined. Therefore, the erroneous determination of the return to normal can be prevented.

REFERENCE SIGNS LIST 1 microcomputer, 2 vehicle sensor, 3 drive circuit, 4 motor, 5 sensor section, 6 exciting circuit, 7, 8 interface circuit, 9 rotor, 10 exciting coil, 11 sine-wave coil, 12 cosine-wave coil, 13 signal circuit.

The invention claimed is:

1. A resolver device, comprising:
   a resolver to output at least one of a sine signal and a cosine signal in accordance with a rotation angle of a rotating body as a detection value;
   an abnormality detector to determine that an abnormality occurs in the resolver in response to the detection value falling out of a predetermined first normal range;
   a region divider to divide the predetermined first normal range into a plurality of regions;
   a region determination section comprising a counter to:
      determine whether or not the detection value falls within a predetermined second normal range when an abnormality flag is turned on in response to the abnormality detector determining that the abnormality occurs;
      determine a region of the plurality of regions within which the detection value falls in response to the detection value falls within the second normal range;
      count, for each of the plurality of regions, a number of times that the detection value is present in each of the plurality of regions; and
      determine that the resolver is normal when the detection value is present in a predetermined number of the plurality of regions and the counted number of times is equal to or greater than a predetermined value; and
   a return determination section that determines to return the resolver to normal operation when the region determination section determines that the resolver is normal after the abnormality detector determines that the resolver is abnormal.

2. The resolver device according to claim 1, wherein the counted number of times is reset when the detection value is determined as being out of the predetermined second normal range.

3. The resolver device according to claim 1, further comprising a rotation angular velocity detector to detect a rotation angular velocity of the rotating body,
   wherein, when the rotation angular velocity detected by the rotation angular velocity detector is equal to or greater than a predetermined value, the return determination section is prohibited from determining to return the resolver to the normal operation or the region determination section is prohibited from determining the resolver as normal.

4. The resolver device according to claim 1, wherein:
   the predetermined first normal range has a predetermined upper limit value and a predetermined lower limit value which are preset for the detection value; and
   the region divider divides the predetermined first normal range defined by the predetermined upper limit value and the predetermined lower limit value into a plurality of regions.

5. The resolver device according to claim 4, wherein the region divider divides the predetermined first normal range by split lines which are preset respectively for the sine signal and the cosine signal.

6. The resolver device according to claim 4, wherein the region divider divides the predetermined first normal range by a split line which is preset at least for the sine signal.

7. The resolver device according to claim 4, wherein the region divider divides the predetermined first normal range by a split line which is preset at least for the cosine signal.

8. The resolver device according to claim 1, wherein:
   the predetermined second normal range has an upper limit value and a lower limit value; and
   at least one of the predetermined upper limit value and the predetermined lower limit value of the predetermined first normal range is different from the upper limit value and the lower limit value of the predetermined second normal range.

9. A motor control device, comprising:
   the resolver device according to claim 1; and a motor as the rotating body, wherein rotation of an output shaft of the motor is detected by the resolver device to control the motor.

10. A motor control method, comprising:

inputting a sine signal and/or a cosine signal, which is output from a resolver in accordance with a rotation angle of a motor, as a detection value of the motor;

determining that an abnormality occurs in the resolver in response to the detection value falling out of a predetermined first normal range;

dividing the predetermined first normal range into a plurality of regions;

determining whether or not the detection value falls within a predetermined second normal range when an abnormality flag is turned on in response to the abnormality detector determining that the abnormality occurs;

determining a region of the plurality of regions within which the detection value falls in response to the detection value falls within the second normal range;

counting, for each of the plurality of regions, a number of times that the detection value is present in each of the plurality of regions; and determining that the resolver is normal when the detection value is present in a predetermined number of the plurality of regions and the counted number of times is equal to or greater than a predetermined value; and determining to return the resolver to normal operation when the resolver is determined as normal after the resolver is determined as abnormal.

* * * * *